(12) United States Patent
Gleacher

(10) Patent No.: US 6,981,565 B2
(45) Date of Patent: Jan. 3, 2006

(54) CRASH DETECTION SYSTEM INCLUDING ROLL-OVER DISCRIMINATION

(75) Inventor: Jeffrey D. Gleacher, West Bloomfield, MI (US)

(73) Assignee: Siemens VDO Automotive Corporation, Auburn Hills ( * ) Notice: Subject to any disclaimer, the term of this patent is extended or adjusted under 35 U.S.C. 154(b) by 323 days.

(21) Appl. No.: 10/614,914

(22) Filed: Jul. 8, 2003

(65) Prior Publication Data

US 2004/0015324 A1   Jan. 22, 2004

Related U.S. Application Data

(60) Provisional application No. 60/401,182, filed on Aug. 5, 2002, provisional application No. 60/397,710, filed on Jul. 22, 2002.

(51) Int. Cl.
*B60R 21/13* (2006.01)

(52) U.S. Cl. .................................. 180/282

(58) Field of Classification Search ............... 180/282; 280/735, 755, 757
See application file for complete search history.

(56) References Cited

U.S. PATENT DOCUMENTS

| 6,282,474 B1 * | 8/2001 | Chou et al. .................... 701/45 |
| 6,421,592 B1 * | 7/2002 | Bargman et al. .............. 701/45 |
| 6,433,681 B1 * | 8/2002 | Foo et al. .................... 340/440 |
| 6,714,848 B2 * | 3/2004 | Schubert et al. .............. 701/46 |
| 2004/0117089 A1 * | 6/2004 | Grotendiek et al. .......... 701/45 |

* cited by examiner

*Primary Examiner*—Eric Culbreth

(57) ABSTRACT

A crash detection system (22) includes a controller (26) that communicates with a plurality of sensors (28, 30, 32). The controller uses a difference between a sensor velocity value and a threshold to discriminate between a roll-over and at least one other type of crash or impact event. If a difference between a sensor velocity and the threshold exceeds the threshold, the controller subtracts that difference from an acceleration influence of a roll-over algorithm to avoid processing sensor data as if a roll-over were happening when, in fact, the event is a different type of crash or impact.

16 Claims, 2 Drawing Sheets

US 6,981,565 B2

CRASH DETECTION SYSTEM INCLUDING ROLL-OVER DISCRIMINATION

CROSS-REFERENCE TO RELATED APPLICATIONS

This application claims priority to Provisional Application No. 60/397,710, which was filed on 22 Jul. 2002 and Provisional Application No. 60/401,182, which was filed on 5 Aug. 2002.

FIELD OF THE INVENTION

This invention generally relates to vehicle crash detection systems. More particularly, this invention relates to a vehicle crash detection system that includes roll-over discrimination.

DESCRIPTION OF THE RELATED ART

Modern day vehicles often include a crash detection system that has a plurality of sensors positioned at strategic locations on the vehicle. The sensors provide velocity information regarding portions of the vehicle, that are indicative of impact events. There are known techniques for interpreting and processing sensor data to control safety systems on a vehicle such as supplemental restraint devices (i.e., air bags).

One difficulty associated with such systems is that sensor data can be misinterpreted. For example, it is possible for one or more sensors on a vehicle to provide sensor information that indicates a vehicle roll-over even though the vehicle is not rolling over but is instead involved in an impact crash. There is a need for an improved technique for interpreting sensor data for discriminating between different type of impacts or crash events.

SUMMARY OF THE INVENTION

In general terms, this invention is a method of interpreting crash sensor data to discriminate between roll-overs and other types of impact events.

One method designed according to this invention includes changing an acceleration influence of a roll-over algorithm when at least one selected sensor velocity exceeds a chosen threshold.

In one example, the sensor velocity is compared to the threshold and a difference between the velocity and the threshold provides information about whether there is a roll-over event. When the difference between the sensor velocity and the threshold exceeds the threshold, that difference is subtracted from an acceleration influence of a roll-over algorithm so that the event is processed as if it were not a roll-over.

An example system designed according to this invention includes at least one crash sensor supported on a vehicle that provides an indication of a sensor velocity. A controller receives the sensor velocity indication and changes the acceleration influence of a roll-over algorithm used by the controller when the sensor velocity exceeds a chosen threshold. In one example, the controller determines whether the sensor velocity exceeds the chosen threshold by determining a difference between the sensor velocity and the threshold. The controller compares the difference to the threshold and subtracts the difference from the acceleration influence when the difference exceeds the threshold.

One example implementation of this invention distinguishes between a side impact event and a roll-over event. In this example, the controller effectively determines a crushing of the vehicle by determining a difference between the velocities of oppositely positioned side impact sensors.

In one example, the controller determines a difference between a first side sensor velocity and the threshold. The controller also determines a difference between a second, laterally opposite side sensor velocity and the threshold. The controller then determines an absolute value of the difference between the first and second differences and compares that absolute value to the threshold. If the absolute value exceeds the threshold, then that value is subtracted from the acceleration influence of the roll-over algorithm.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
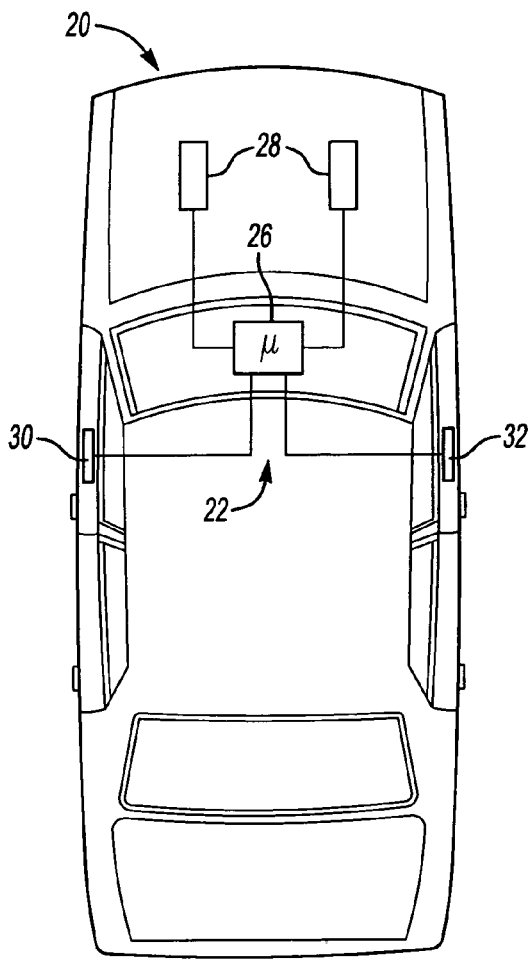
FIG. 1 schematically illustrates a vehicle incorporating a crash detection system designed according to this invention

FIG. 1 schematically shows a vehicle 20 that has a crash detection system 22. A controller 26 communicates with a plurality of crash sensors on the vehicle 20. Front sensors 28 provide an indication of a velocity of the front portion of the vehicle, for example. The illustrated example system includes a first side sensor 30 on a left side of the vehicle and a second, laterally opposite side sensor 32 on a right side of the vehicle. The sensors operate in a known manner and the controller 26 uses known techniques for interpreting data such as velocity indications from the sensors.

The inventive system includes the ability to discriminate between a roll-over event and another type of impact event such as a frontal crash or a side impact.

Figure 2:
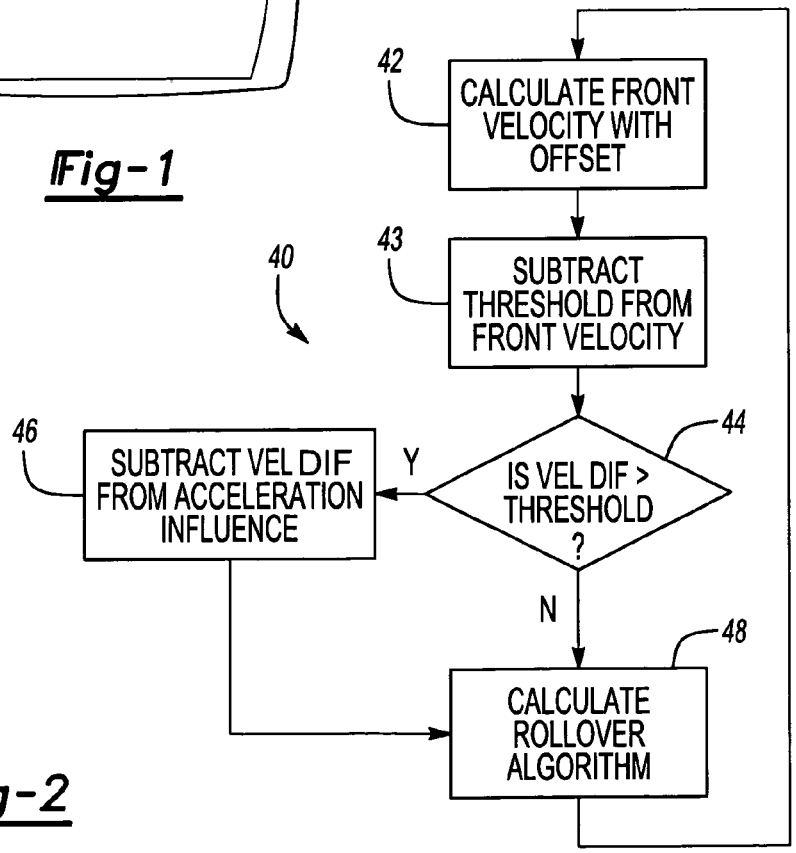
FIG. 2 is a flow chart diagram illustrating an example method of this invention.

FIG. 2 includes a flow chart diagram 40 that summarizes an example approach designed according to this invention for discriminating between a front impact event and a roll-over. At 42, the controller 26 determines the front velocity from the velocity indication provided by at least one of the front sensors 28. The determination of front velocity preferably includes an offset, as known in the art, for accommodating any sensor drift or sensor calibration that must occur over time.

At 43 the controller 26 subtracts a threshold from the front velocity. The threshold is selected to provide the ability to discriminate between a frontal crash event and a roll-over. Given this description and the particular configuration of a particular vehicle and the crash detection system associated with that vehicle, those skilled in the art will be able to select an appropriate threshold. The threshold value will vary, depending on the vehicle and the crash detection system components, for example. Crash testing data, for example, provides the ability to arrive at an appropriate threshold value.

The controller 26 compares the difference between the threshold and the front velocity to the threshold at 44. If the difference exceeds the threshold, then the controller 26 subtracts that difference from the acceleration influence of the roll-over algorithm used by the controller 26 when processing sensor data to determine whether there is a roll-over event. After subtracting that difference from the acceleration influence, the controller 26 proceeds with the roll-over algorithm 48 in a known manner. If the difference between the threshold and the front velocity does not exceed the threshold then the roll-over algorithm proceeds in a normal manner without any adjustment.

Discriminating between a front crash event and a roll-over allows for better control of safety devices such as side curtains and front airbags. Those skilled in the art who have the benefit of this description will be able to utilize the discriminating capabilities of this invention to customize the control of such safety devices provided in a given system.

Figure 3:
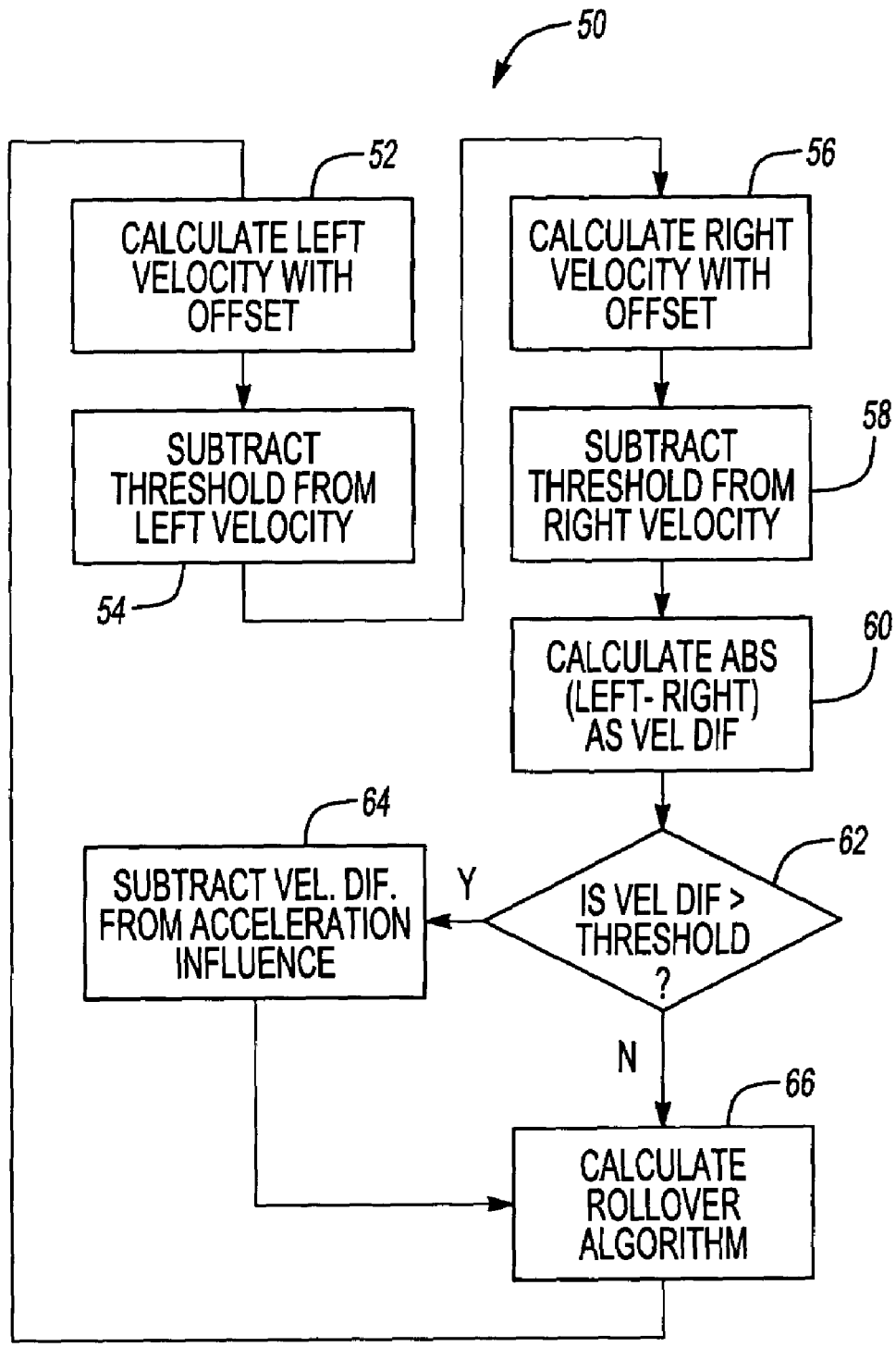
FIG. 3 is a flow chart diagram illustrating another example method of this invention.

FIG. 3 includes a flow chart diagram 50 that summarizes a technique according to this invention for discriminating between a side impact and a roll-over event. At 52, the controller 26 determines a left velocity based upon the velocity indication provided by the left side sensor 30. The velocity determination preferably includes an offset to accommodate for sensor drift and other calibration variables as known in the art. At 54, the controller 26 subtracts the threshold from the determined left velocity. Given this description, those skilled in the art will be able to develop an appropriate threshold based upon crash data information for a particular vehicle and a particular system. The threshold will vary depending on the vehicle configuration and the components selected for the crash detection system.

At 56, the controller 26 determines a right velocity based upon a velocity indication provided by the side sensor 32 on the right side of the vehicle. Again, an appropriate offset preferably is used. At 58, the controller 26 subtracts the threshold from the right velocity.

In this example, the difference between the left velocity and the threshold is considered a first difference while the difference between the right velocity and the threshold is considered a second difference. At 60, the controller 26 determines an absolute value of a difference between the first difference and the second difference. That absolute value is a velocity difference value.

At 62, the controller 26 determines whether the velocity difference value exceeds the threshold. If so, the controller subtracts the velocity difference value from the acceleration influence of the roll-over algorithm at 64. The controller then proceeds with the roll-over algorithm at 66 in a known manner with the reduced acceleration influence value. In the event that the velocity difference value does not exceed the threshold, the controller 26 performs the roll-over algorithm at 66 in a known manner.

The velocity difference value provides an indication of an amount of crushing of the vehicle as would occur during a side impact. The controller 26 is determining relative velocities of the side sensors, which provides an indication of one sensor moving toward the other, which indicates a side impact, for example. Using both velocities compared to the threshold provides a better indication of such movement of the vehicle compared to a roll-over where one of the side sensors may have a higher velocity value than the other. Given the relationship between both velocity values and the threshold, this invention provides the ability to determine an amount of compression or crushing occurring during a side impact event.

This invention provides the ability to discriminate between frontal impact events and roll-overs. The inventive arrangement also provides the ability to discriminate between side impact events and roll-overs. This invention provides an economical and reliable way to interpret crash sensor data to discriminate between different types of crash events.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A method of interpreting crash sensor data, comprising: changing an acceleration influence of a rollover algorithm when at least one selected sensor velocity exceeds a chosen threshold.

2. The method of claim 1, including determining whether the sensor velocity exceeds the chosen threshold by determining a difference between the sensor velocity and the threshold and comparing the difference to the threshold.

3. The method of claim 2, including subtracting the difference from the acceleration influence when the difference exceeds the threshold.

4. The method of claim 1, said at least one sensor velocity including a front sensor velocity, said method including determining a difference between the front sensor velocity and the threshold and subtracting the difference from the acceleration influence when the difference exceeds the threshold.

5. The method of claim 1, including determining a side impact condition by determining a difference between the sensor velocities of at least two sensors that are positioned on laterally opposite sides of a vehicle.

6. The method of claim 5, including determining if the difference is greater than the threshold and subtracting the difference from the acceleration influence when the difference is greater than the threshold.

7. The method of claim 1, including determining a first difference between a first side sensor velocity and the threshold, determining a second difference between a second, laterally oppositely positioned sensor velocity and the threshold and determining a side velocity value from the difference between the first difference and the second difference.

8. The method of claim 7, including subtracting the side velocity value from the acceleration influence when the side velocity value exceeds the threshold.

9. A system for determining a type of vehicle crash event, comprising:
at least one crash sensor that provides an indication of a sensor velocity; and
a controller that receives the sensor velocity indication and changes an acceleration influence of a rollover algorithm used by the controller when the sensor velocity exceeds a chosen threshold.

10. The system of claim 9, wherein the crash sensor comprises a front sensor that provides an indication of a velocity of a front portion of the vehicle and the controller determines a difference between the front sensor velocity and the threshold and subtracts the difference from the acceleration influence when the difference exceeds the threshold.

11. The system of claim 9, wherein the controller determines whether the sensor velocity exceeds the chosen threshold by determining a difference between the sensor velocity and the threshold and comparing the difference to the threshold.

12. The system of claim 11, wherein the controller subtracts the difference from the acceleration influence when the difference exceeds the threshold.

13. The system of claim 9, including at least one first side crash sensor that provides an indication of a side velocity of a first side of the vehicle, at least one second side crash sensor that provides an indication of a side velocity of a second side of the vehicle and wherein the controller determines a side impact condition based upon a determined difference between the first and second side sensor velocities.

14. The system of claim 13, wherein the controller determines if the difference is greater than the threshold and subtracts the difference from the acceleration influence when the difference is greater than the threshold.

15. The system of claim 9, including at least one first side crash sensor that provides an indication of a side velocity of a first side of the vehicle, at least one second side crash sensor that provides an indication of a side velocity of a second side of the vehicle and wherein the controller determines a first difference between the first side sensor velocity and the threshold, a second difference between the second side sensor velocity and the threshold and determines a side velocity value from a difference between the first difference and the second difference.

16. The system of claim 15, wherein the controller subtracts the side velocity value from the acceleration influence when the side velocity value exceeds the threshold.

* * * * *